(12) United States Patent
Down

(10) Patent No.: US 10,759,582 B2
(45) Date of Patent: Sep. 1, 2020

(54) RECLOSABLE PACKAGE AND LAMINATE

(71) Applicant: Kraft Foods R & D, Inc., Deerfield, IL (US)

(72) Inventor: Matthew James Down, Birmingham (GB)

(73) Assignee: Kraft Foods Schweiz Holding GmbH, Zug (CH)

( * ) Notice: Subject to any disclaimer, the term of this patent is extended or adjusted under 35 U.S.C. 154(b) by 151 days.

(21) Appl. No.: 15/558,166

(22) PCT Filed: Mar. 15, 2016

(86) PCT No.: PCT/US2016/022417
§ 371 (c)(1),
(2) Date: Sep. 13, 2017

(87) PCT Pub. No.: WO2016/149240
PCT Pub. Date: Sep. 22, 2016

(65) Prior Publication Data
US 2018/0079575 A1    Mar. 22, 2018

Related U.S. Application Data

(60) Provisional application No. 62/135,360, filed on Mar. 19, 2015.

(51) Int. Cl.
*B65D 75/58* (2006.01)
*B32B 7/06* (2019.01)
(Continued)

(52) U.S. Cl.
CPC ............ *B65D 75/5838* (2013.01); *B32B 3/00* (2013.01); *B32B 7/06* (2013.01); *B32B 7/12* (2013.01);
(Continued)

(58) Field of Classification Search
None
See application file for complete search history.

(56) References Cited

U.S. PATENT DOCUMENTS

2007/0054071 A1*  3/2007  Nageli .................... B32B 7/14
                                                    428/34.2
2009/0226117 A1  9/2009  Davis
(Continued)

FOREIGN PATENT DOCUMENTS

| EP | 1753670 | 12/2013 |
|---|---|---|
| EP | 2243716 | 5/2014 |

(Continued)

OTHER PUBLICATIONS

International Preliminary Report on Patentability, dated Sep. 28, 2017, for International Application No. PCT/US2016/022417 (9 pgs.).

(Continued)

*Primary Examiner* — Viren A Thakur
(74) *Attorney, Agent, or Firm* — Fitch, Even, Tabin & Flannery LLP

(57) ABSTRACT

A flexible laminate suitable for forming a package (10) having a reclosable flap (12) is provided that includes pressure sensitive adhesive (34) extending in a periphery region past a reseal margin (42) for the flap (12) and on an opposite side therefrom for joining an outer and inner layer (30, 36) of the laminate together, whether directly or indirectly. The pressure sensitive adhesive (34) can overlie a permanent adhesive (32) in the periphery region, or directly join the outer and inner layers of the laminate together. The use of pressure sensitive adhesive (34) in the region can reduce the tight registration needed for cutting the outer layer (30) to define an outward layer of the flap (12), thereby reducing the chances for cutting into a portion of the outer (Continued)

layer (30) joined only by permanent adhesive (32) to the inner layer (36).

17 Claims, 4 Drawing Sheets

(51) Int. Cl.
    *B32B 7/12*     (2006.01)
    *B32B 27/08*     (2006.01)
    *B32B 3/00*     (2006.01)
    *B65D 65/40*     (2006.01)
    *B32B 37/12*     (2006.01)

(52) U.S. Cl.
    CPC .............. *B32B 27/08* (2013.01); *B65D 65/40* (2013.01); *B32B 37/1284* (2013.01); *B32B 2307/41* (2013.01); *B32B 2307/412* (2013.01); *B32B 2307/546* (2013.01); *B32B 2307/58* (2013.01); *B32B 2307/5825* (2013.01); *B32B 2307/748* (2013.01); *B32B 2435/02* (2013.01); *B32B 2439/40* (2013.01); *B32B 2439/70* (2013.01); *B65D 2575/586* (2013.01)

(56) References Cited

U.S. PATENT DOCUMENTS

| | | | |
|---|---|---|---|
| 2010/0278454 A1 | 11/2010 | Huffer | |
| 2012/0082764 A1* | 4/2012 | Paterson | ................... B32B 7/06 |
| | | | 426/127 |
| 2013/0292458 A1* | 11/2013 | Cheema | ................... B32B 7/12 |
| | | | 229/87.01 |
| 2018/0170642 A1* | 6/2018 | Dugonjic | ........... B65D 75/5838 |

FOREIGN PATENT DOCUMENTS

| | | | |
|---|---|---|---|
| EP | 2769930 A1 * | 8/2014 | ......... B65D 85/1018 |
| WO | 2013114091 | 8/2013 | |
| WO | 2015139941 | 9/2015 | |
| WO | WO-2015139941 A1 * | 9/2015 | ......... B65D 75/5838 |

OTHER PUBLICATIONS

International Search Report and Written Opinion of the International Search Authority, dated Jun. 1, 2016, for International Application No. PCT/US2016/022417 (12 pgs.).

Examination report No. 1, dated Dec. 4, 2017 for Australian Application No. 2016233448 (3 pgs.).

\* cited by examiner

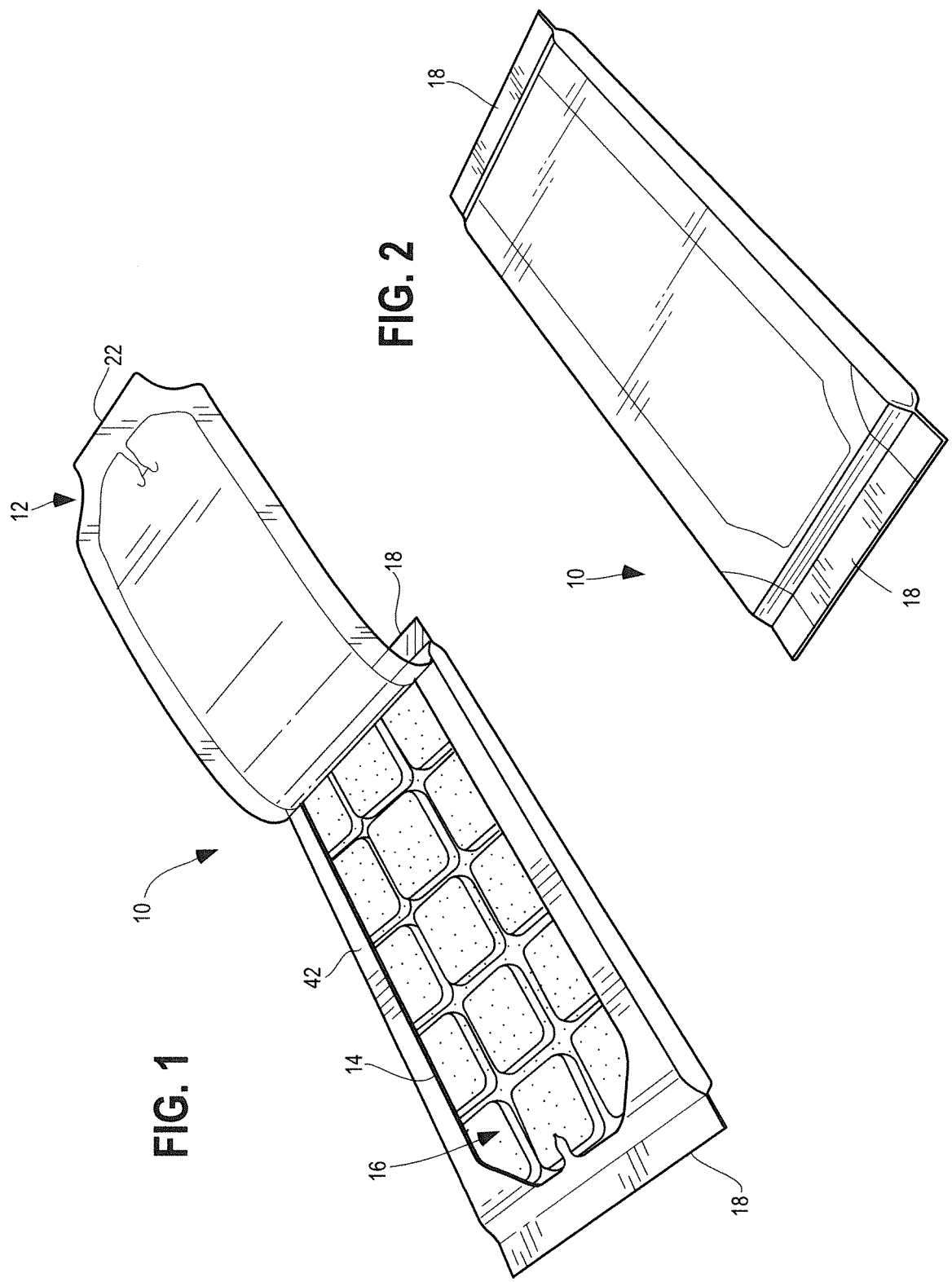

RECLOSABLE PACKAGE AND LAMINATE

CROSS REFERENCE TO RELATED APPLICATIONS

This application is a U.S. national phase application of International Application No. PCT/US2016/022417, filed Mar. 15, 2016, which claims benefit from U.S. Application 62/135,360, filed Mar. 19, 2015, which are each hereby incorporated herein by reference in their entirety.

FIELD

A reclosable package configured for improved appearance is described herein, and, in particular, a reclosable package having an openable flap configured for improved appearance adjacent the flap prior to initial opening, as well as a laminate suitable for making the package.

BACKGROUND

Flexible film packages are known in the art for storing and shipping products. These flexible film packages can provide a lightweight package with a hermetic seal. A partial or substantial hermetic seal makes such flexible film packages particularly useful for storing a variety of food products, including, for example, crackers, chewing gum, chocolate bars, cookies, cheese sandwiches, biscuits, candy, meat products, and dried fruits and vegetables. Further, such flexible film packages may be used for non-food applications such as medical, pharmaceutical, or industrial packaging applications. Depending on the product, some of these flexible film packages also may contain structural supports, such as a frame or tray, whereas others may only contain the products to be packaged.

One type of flexible film package is formed from a single web of material that is formed or wrapped around a product. These types of packages can be formed by enveloping or wrapping the product with the web of material and forming a longitudinal seal, such as a fin, bottom, or lap seal with two edge portions of the web of material. A pair of end seals may then be formed in the web to enclose the product, and then the package singulated from the remainder of the web. In other embodiments, packages formed from more than a single web of material and numerous side-seals can be formed. Because these types of packages can provide hermetically sealed enclosures, they are suitable for packaging food products.

The flexible film packages can be reclosable. In one example, reclosable packages can be formed from a film laminate that includes an outer layer of one or more films and an inner layer of one or more films. The top and bottom layers are adhesively sealed together, and a flap is die cut into the top and bottom layers. More specifically, a U-shaped die cut is cut into the outer layer, and a similar but smaller die cut is cut into the inner layer. When the flap, which includes both the inner and outer layers within the U-shaped die cuts, is opened, a reseal margin of just the inner layer is exposed. Permanent adhesive can be use throughout the package, except in the reseal margin where a pressure sensitive adhesive is used to enable the flap to be opened and closed multiple times against the reseal margin. In order to ensure that the permanent adhesive is not in the reseal margin, the two adhesives are spaced from each other, leaving a gap aligned with the U-shaped die cut of the outer layer.

SUMMARY

A flexible laminate suitable for forming a package having a reclosable flap is provided that includes pressure sensitive adhesive extending in a periphery region past a reseal margin for the flap and on an opposite side therefrom for joining an outer and inner layer of the laminate together. The pressure sensitive adhesive can either overlie a permanent adhesive in the periphery region or directly join the outer and inner layers of the laminate together. Advantageously, the use of pressure sensitive adhesive in the region can reduce the tight registration needed for cutting the outer layer to define an outward layer of the flap, thereby reducing the chances for cutting into a portion of the outer layer joined only by permanent adhesive to the inner layer. Moreover, if the outer layer is clear or transparent, the lens effect—that can arise if the pressure sensitive adhesive and permanent adhesive are stepped back from each and the cut is made therebetween—can be avoided.

A flexible laminate, which can be part of a larger web of material, suitable for forming a package having a reclosable flap can include an inner layer having a cut defining an inward layer of the flap and an outer layer having a cut defining an outward layer of the flap. The outward layer of the flap can be larger than the inward layer of the flap such that a reseal margin is formed on the inner layer adjacent the inward layer of the flap and outwardly of the cut of the outer layer. When the flap is closed, the outward layer of the flap can adhere to the reseal margin of the inner layer to block access to an opening defined by the flap. Pressure sensitive adhesive, whether alone or at least in part overlying the permanent adhesive, can be used to join the inner and outer layers together between at least, on one side, the cut of the inner layer and, on the other side, extending at least partially outwardly past the cut of the outer layer. Permanent adhesive can be used to join the inner and outer layers together outwardly of the pressure sensitive adhesive and, optionally, inwardly of the pressure sensitive adhesive between part of the inward and outward layers of the flap.

In one aspect, the cuts of the inner and outer layers are each generally U-shaped.

In another aspect, the permanent adhesive can be disposed between, on one side, the inner layer and, on another side, the pressure sensitive adhesive joining the inner and outer layers together, whether directly or indirectly, between the cut of the inner layer and the cut of the outer layer and extending partially outwardly past the cut of the outer layer.

In another aspect, a package integrity indicating feature can be incorporated, such as one or more strips that break to fully open the flap.

In another aspect, pressure sensitive adhesive can be disposed adjacent the inward and outward layers of the flap to join inward and outward layers of the flap together.

In another aspect, the reseal margin of the inner layer can have a greater affinity for adhesion of the pressure sensitive adhesive as compared to the outward layer of the flap that contacts the reseal margin. For instance, the reseal margin of the inner layer can be more tacky when the flap is opened as compared to the portion of the outward layer of the flap that closes against the reseal margin.

In another aspect, wherein permanent adhesive can be disposed adjacent the inward and outward layers of the flap to join inward and outward layers of the flap together.

In another aspect, a starter portion can be incorporated into the laminate. The starter portion can be used to initiate opening of the flap. The starter portion can be a portion of the outward layer of the flap defined at least in part by the cut of the outer layer and an adhesive free or at least partially adhesive deadened region between the starter portion and an underlying portion of the inner layer.

The laminates described herein can be formed into a package, which can include a food product disposed within an interior of the package. In one exemplary form, the package can include a top panel, a bottom panel, a pair of end seals, and a fin seal adjacent the back panel. The flap can be provided on the front panel.

In any of the laminates and packages described herein, the outward layer of the flap or the outer layer can be clear or transparent and the inward layer of the flap or the inner layer can be opaque.

BRIEF DESCRIPTION OF THE DRAWINGS

FIG. 1 is a top perspective view of a package for a food product configured for an improved appearance adjacent the perimeter of a reclosable flap, with the reclosable flap shown in a closed position;

FIG. 2 is a top perspective view of the package of FIG. 1 showing the reclosable flap in an open position to permit access to the food product within the package;

DETAILED DESCRIPTION

Figure 3:
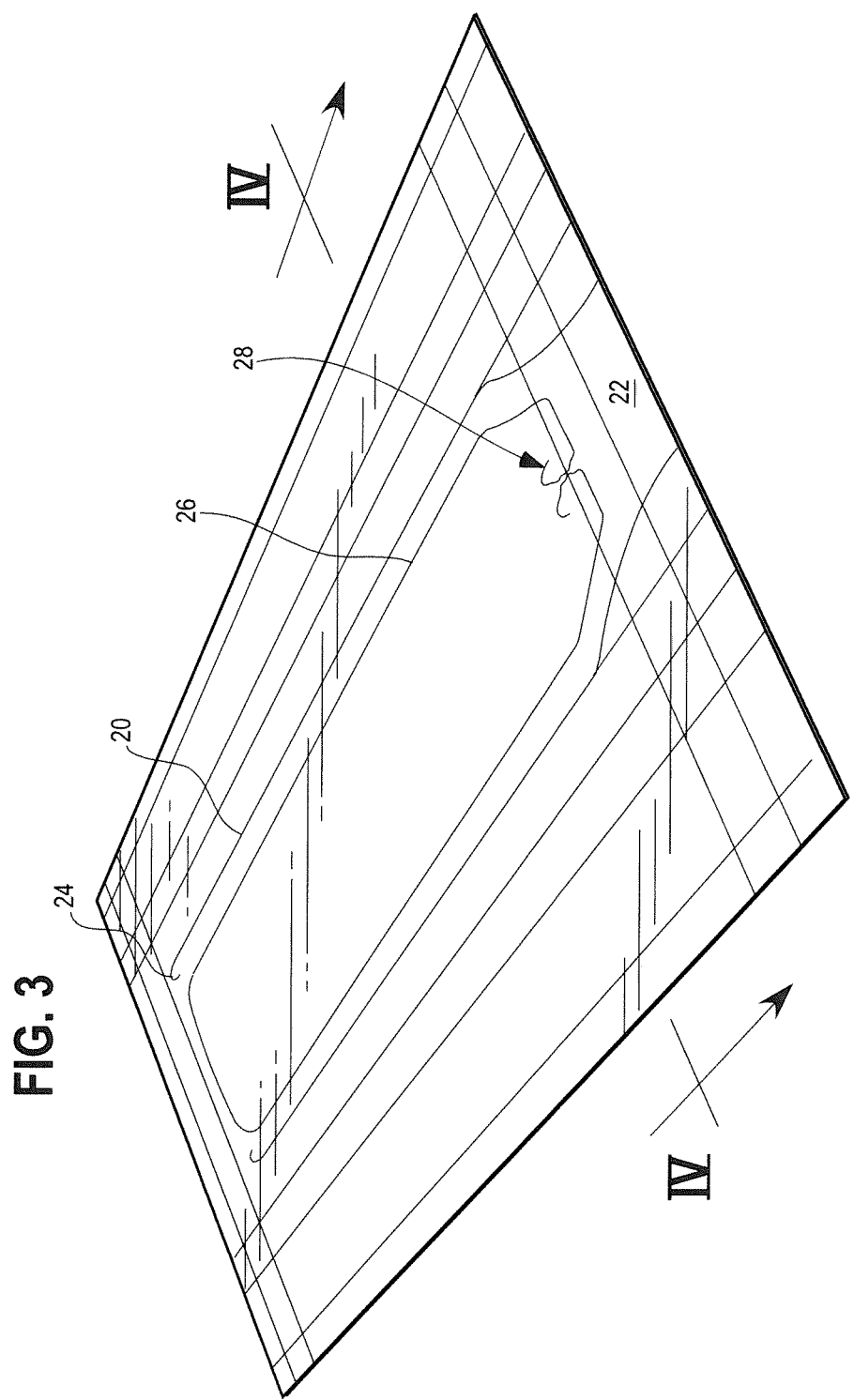
FIG. 3 is a perspective view of a segment of a web of material, having with inner and outer layers, suitable for forming the package of FIG. 1, showing die cuts in the inner and outer layers, as well as lines indicating where folding and sealing of the web will occur to form the package.

A laminate of flexible film suitable for forming a package having a reclosable flap is described herein, as well as packages formed from the laminate. The laminate includes an inner layer and an outer layer that are adhesively joined together with a combination of permanent adhesive and pressure sensitive adhesive. Advantageously, the pressure sensitive adhesive extends past a reseal margin for the flap and on an opposite side therefrom for joining the outer and inner layer of the laminate together. As will be described herein, the pressure sensitive adhesive can either overlie a permanent adhesive in at least the periphery region or directly join the outer and inner layers of the laminate together in the flap.

With reference to an exemplary embodiment of the package, illustrated in FIGS. 1 and 2, the package 10 is formed from a flexible film laminate wrapped around a food item 16, such as a chocolate bar. The package 10 includes a pair of end seals 18 with an interior therebetween. Access to the interior of the package 10 is through an opening in a top panel of the package 10 that is formed when a flap 12 is moved from a closed position, shown in FIG. 2, to an open position, shown in FIG. 1. The flap 12 can moved from the open position back to the closed position and readhered to the portion of the package 10 disposed about the opening, thereby allowing for the package 10 to be opened and closed multiple times as the food product 16 is consumed.

Figure 4B:
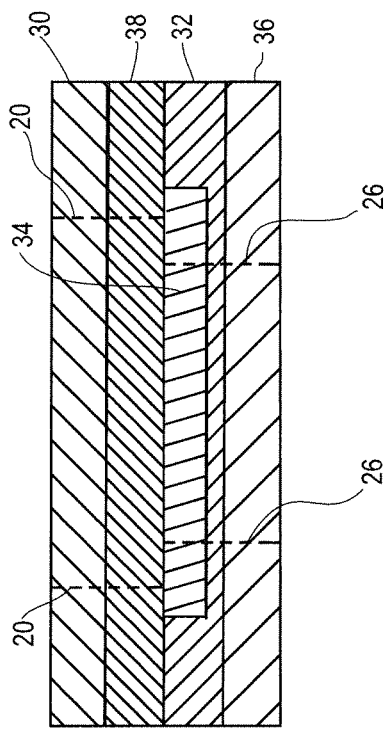
FIG. 4B is an alternative construction similar to that of FIG. 4A, but with the outer layer having an inward layer of ink.

The laminate used to make the package, illustrated in FIG. 3, includes an outer layer 30 and an inner layer 36 adhesively joined to each other using a combination of a permanent adhesive 32 and a pressure sensitive adhesive 34. A cut 20 is made in the outer layer 30 (which outer layer 30 can optionally include an ink layer 38, as shown in FIGS. 4B, 5B and 6B, as discussed below) to define what will be an outward layer of the flap 12 once the flap 12 is initially separated from the remainder of the package 10. A cut 26 is also made in the inner layer 36 to define what will be an optional inward layer of the flap 12 once the flap 12 is initially separated from the remainder of the package 10. The inward layer of the flap 12 is optional, as it can be removed after cutting or prior to lamination. The cut 26 of the inner layer 36 can also define a package integrity feature 28, as will be described below. The cut 20 of the outer layer can include a J-hook 24 which can act as a stop for limiting opening of the flap 12.

The cut 26 of the inner layer 36 is within a projection of the cut 20 of the outer layer 30, as illustrated in FIG. 3, such that the inward layer of the flap 12 is smaller than the outward layer of the flap 12. This creates a reseal margin 42 on the inner layer 36 disposed about the opening 14, as shown in FIG. 1, and to which the flap 12 can be initially adhered as well as readhered to when moved from its open position to its closed position. In particular, the reseal margin 42 is defined between the opening 14 and the cut 20 of the outer layer 30. The outward layer of the flap 12 disposed about the periphery of the inward layer of the flap 12 is removable from and reattachable to the reseal margin 42. In order to allow for the initial opening of the flap 12 as well as subsequent reclosures, a pressure sensitive adhesive as opposed to a permanent adhesive is used on the reseal margin 42. That portion of the pressure sensitive adhesive can either have a greater affinity for adhesion to the flap 12 or to the reseal margin 42.

Figure 7:
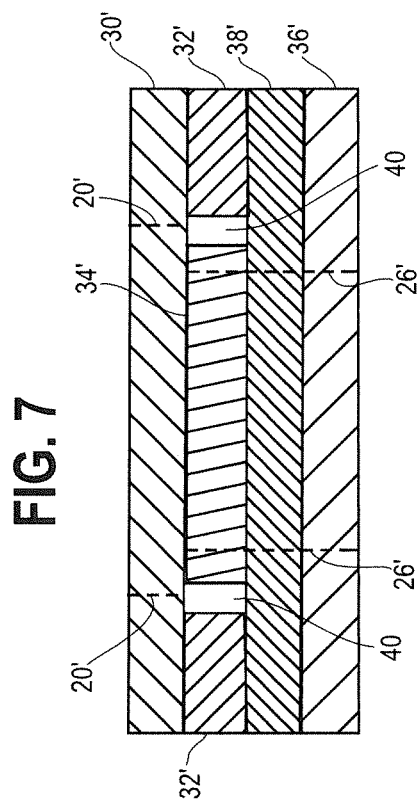
FIG. 7 is an exaggerated diagrammatic representation of a cross-sectional view of an alternative construction of the web of FIG. 3, but showing the pressure sensitive adhesive spaced from the permanent adhesive creating a gap in the reseal margin on the inner layer.

One way to construct a laminate for forming the package 10 described above and to ensure that the permanent adhesive 32' is not in the reseal margin is to space the permanent adhesive 32' from the pressure sensitive adhesive 34' so that only the pressures sensitive adhesive 34' is in the reseal margin, as depicted in FIG. 7. The two adhesives 32' and 34' are spaced from each other, leaving a gap 40 which the cut 20' of the outer layer 30' is aligned with, also as depicted in FIG. 6. However, as discussed above, this type of construction can lead to two problems. First, the cut 20' of the outer layer 30' must be precisely placed within the gap 40. This can require tight manufacturing tolerances. Second, if the outer layer 30' is clear or transparent, then the gap 40 (whether in the reseal margin or outwardly therefrom) can create a lens effect that can be visually unappealing.

In order to avoid the aforementioned tight manufacturing tolerances and visually unappealing lens effect, the gap 40 in the construction of the laminate between the permanent and pressure sensitive adhesives is eliminated. Instead, the pressures sensitive adhesive 34 is extended past the reseal margin, as illustrated in FIGS. 4-5 (the differences between which will be described herein). The cut 20 of the outer layer 30 can then be made above or into the pressure sensitive adhesive 34, or even spaced between the pressure sensitive adhesive and the thereby avoiding the tight manufacturing tolerances for avoiding the permanent adhesive 32 with the cut 20. This construction also obviates the need for the aforementioned gap 40 to span on both sides of the cut 20, and thereby avoidance of the lens effect.

Figure 4A:
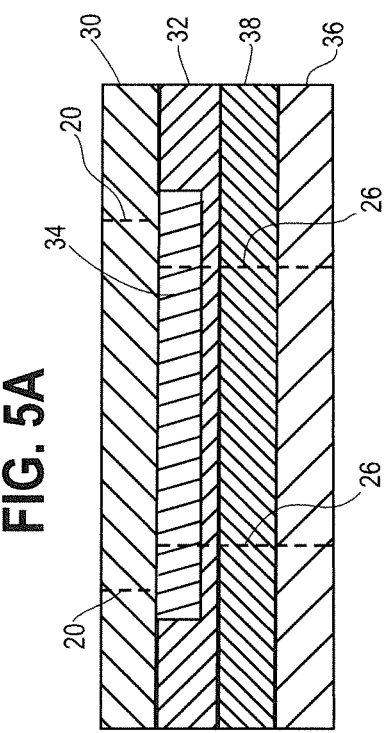
FIG. 4A is an exaggerated diagrammatic representation of a cross-sectional view of the web of FIG. 3 taken along line IV-IV thereof, and showing a pressure sensitive adhesive extending past a reseal margin for the flap and permanent adhesive spaced from the flap, along with the inner layer having an outward layer of ink.

Turning to the details of a first exemplary construction of the laminate, illustrated in FIG. 4A, the laminate is formed of the outer layer 30 and the inner layer 36. The two layers 30 and 36 are joined together in the flap 12 and, specifically, the outward and inward layers of the flap 12, using the pressure sensitive adhesive 34. The pressure sensitive adhesive 34 extends not only into the reseal margin defined by the portion of the inner layer 36 that is disposed between a projection of the cut 20 of the outer layer 30 and the cut 26 of the inner layer 36 but also outwardly from the reseal margin on an opposite side thereof from the outward layer of the flap 12. The permanent adhesive 32 is used to join the remainder of the laminate together, or at least the portion immediately outward of the pressure sensitive adhesive 30.

Figure 5A:
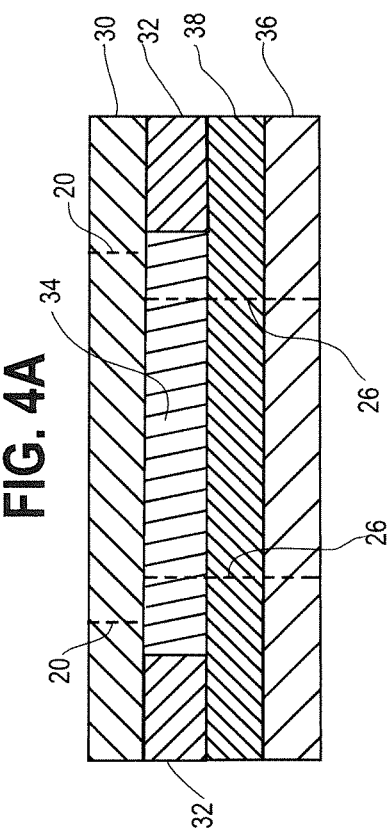
FIG. 5A is an exaggerated diagrammatic representation of a cross-sectional view of an alternative construction of the web of FIG. 3, similar to that of FIG. 4 but showing the pressure sensitive adhesive overlying permanent adhesive in the flap, along with the inner layer having an outward layer of ink.
Figure 5B:
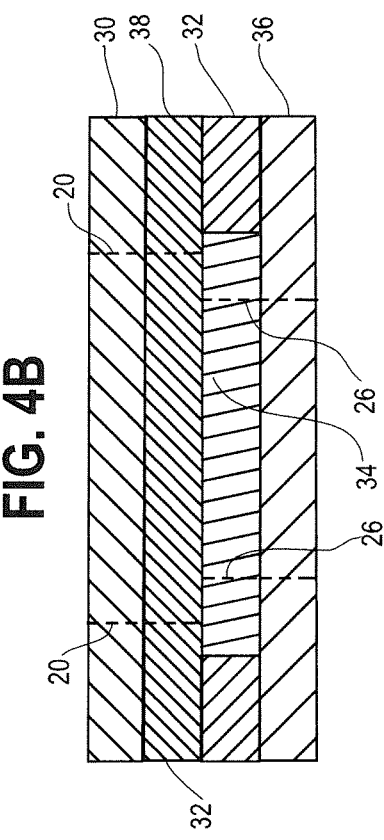
FIG. 5B is an alternative construction similar to that of FIG. 5A, but with the outer layer having an inward layer of ink.

With respect to the second exemplary construction of the laminate, illustrated in FIG. 5A, the laminate is formed similarly to the laminate discussed above with reference to FIG. 4A. The difference is that in the second exemplary construction the permanent adhesive 32 is present between the inward and outward layers of the flap 12. However, the permanent adhesive 32 does not join the two layers of the flap 12 together. Instead, the pressure sensitive adhesive 34 overlies the permanent adhesive 32 between the two layers of the flap 12, in the reseal margin, and also outwardly from the reseal margin on an opposite side thereof from the outward layer of the flap 12.

Figure 6A:
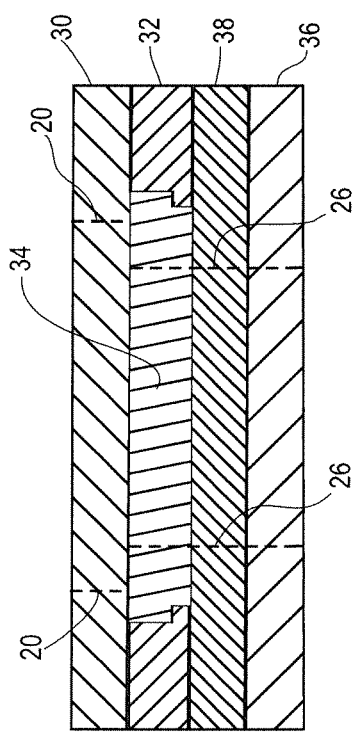
FIG. 6A is an exaggerated diagrammatic representation of a cross-sectional view of an alternative construction of the web of FIG. 3, but showing the pressure sensitive adhesive overlying permanent adhesive outside the reseal margin and only pressure sensitive adhesive in the flap, along with the inner layer having an outward layer of ink.
Figure 6B:
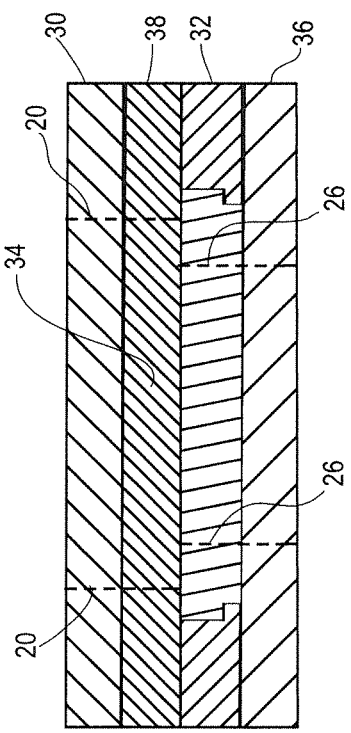
FIG. 6B is an alternative construction similar to that of FIG. 6A, but with the outer layer having an inward layer of ink.

With respect to the third exemplary construction of the laminate, illustrated in FIG. 6A, the laminate is formed similarly to the laminate discussed above with reference to FIG. 4A. The difference is that in the second exemplary construction the permanent adhesive 32 partially underlies the pressure sensitive adhesive 34 in a small region outside of the reseal margin. The cut 20 is aligned with the small region where the permanent adhesive 32 is overlapped by the pressure sensitive adhesive 34.

With respect to details of construction, it will be understood that either or both of the outer layer 30 and inner layer 36 can in turn be themselves laminates or have coatings. For example, the inner layer 36 can have an outward layer of ink 38 to display graphics. Also by way of example, the outer layer 30 can have an inward layer of ink 38 (as shown in FIGS. 4B, 5B and 6B), in which case optionally either the ink 38 can include a release additive so that the pressure sensitive adhesive 34 more readily releases or a primer under at least the pressure sensitive adhesive 34 for more ready adhesion to ensure release between the pressure sensitive adhesive and the ink 38. Also, it will be understood that the term "cut" as used herein can refer to both a single, continuous cut or a series of cuts that together allow for the opening of the flap 12 described herein. The cuts may be formed in a variety of manners, including mechanical formation or laser formation. Further, the use of the terms "permanent" and "pressure sensitive" when describing the adhesives are not absolute terms, but rather relative terms. That is, the permanent adhesive is simply stronger than the pressures sensitive adhesive, and the pressures sensitive adhesive permits opening and closing of the flap a plurality of times. Indeed, the adhesive strengths do not have to be constant, but rather can vary. That is, the strength of either or both of the pressure sensitive adhesive and the permanent adhesive can vary. For example, permanent adhesive adjacent the pressure sensitive adhesive can have less or more strength that the permanent adhesive elsewhere.

Turning to details of the package, particularly the integrity feature 28, the flap 12 can be separated from the remainder of the laminate to expose the opening 14 whereby access to the contents of the package 10 may be gained after a strip is broken. The strip is integrally joined, and remains attached to the remaining portion of the inner layer 36. The strip has a weakened portion defined by a narrowing in the width of the strip. The narrowing portion provides an area of weakness to the strip whereby the strip breaks at the narrowing portions upon opening the flap 12 for a first time. In addition, a starter portion 22 of the outward layer of the flap 12 can be defined at least in part by the cut 20 of the outer layer 30 and an adhesive free or at least partially adhesive deadened region between the starter portion 22 and an underlying portion of the inner layer 36 such that the starter portion 22 can be used to initiate opening of the flap 12.

Examples of suitable materials for the package 10 can include an outer layer formed of a laminate of clear OPP, pressure sensitive adhesive and ink; and a bottom web formed of a white OPP, ink suitable for food contact and a lacquer suitable for food contact. Of course, there are many other suitable materials that could be used.

Although exemplary packages and laminates are described herein, it will be understood that various substitutes and modifications can be made while still achieving at least some of the advantages discussed herein.

The invention claimed is:

1. A flexible laminate comprising a reclosable flap, and suitable for forming a package, the laminate comprising:
    an inner layer having a cut defining an inward layer of the reclosable flap;
    an outer layer having a cut defining an outward layer of the reclosable flap, the outward layer of the reclosable flap being larger than the inward layer of the reclosable flap such that a reseal margin is formed on the inner layer between the cut of the inner layer and the cut of the outer layer;
    pressure sensitive adhesive joining the inner and outer layers together between the cut of the inner layer and the cut of the outer layer, and the pressure sensitive adhesive extending partially outwardly past the cut of the outer layer; and
    permanent adhesive joining the inner and outer layers together outwardly of the pressure sensitive adhesive and outside of the reseal margin;
    wherein the permanent adhesive does not overlap the pressure sensitive adhesive within the reseal margin, and the permanent adhesive is in contact with and overlaps only a portion of the pressure sensitive adhesive in a region located outside of the reseal margin to form a stepped configuration.

2. The flexible laminate of claim 1, wherein the cuts of the inner and outer layers define a generally U-shape of the reclosable flap.

3. The flexible laminate of claim 1, wherein the permanent adhesive is disposed between the inner layer and the pressure sensitive adhesive.

4. The flexible laminate of claim 1, further comprising means for indicating package integrity.

5. The flexible laminate of claim 1, wherein the pressure sensitive adhesive is also disposed adjacent the inward and outward layers of the reclosable flap to join inward and outward layers of the reclosable flap together.

6. The flexible laminate of claim 5, wherein the reseal margin has a greater affinity for adhesion of the pressure sensitive adhesive as compared to the outward layer of the reclosable flap that contacts the reseal margin.

7. The flexible laminate of claim 1, wherein the permanent adhesive is also disposed adjacent the inward and outward layers of the reclosable flap to join inward and outward layers of the reclosable flap together.

8. The flexible laminate of claim 1, further comprising a starter portion of the outward layer of the reclosable flap defined at least in part by the cut of the outer layer and an adhesive free or at least partially adhesive deadened region between the starter portion and an underlying portion of the inner layer such that the starter portion can be used to initiate opening of the reclosable flap.

9. The flexible laminate of claim 1, wherein the reseal margin has a greater affinity for adhesion of the pressure sensitive adhesive as compared to the outward layer of the reclosable flap that contacts the reseal margin.

10. The flexible laminate of claim 1, wherein the laminate is part of a web of material.

11. A package formed of the flexible laminate of any one of the preceeding claims.

12. The package of claim 11, in combination with a food product disposed within the package.

13. The package of claim 12, wherein the package comprises a top panel, a bottom panel, a pair of end seals, and a fin seal adjacent the back panel, and wherein the reclosable flap is on the front panel.

14. The flexible laminate claim 1, wherein the outward layer of the reclosable flap is transparent and the inward layer of the reclosable flap is opaque.

15. The flexible laminate of claim 1, wherein the outer layer is transparent and the inner layer is opaque.

16. The flexible laminate of claim 1, wherein the permanent adhesive does not extend across the reseal margin.

17. The flexible laminate of claim 1, wherein the stepped configuration comprises the permanent adhesive extending under the portion of the pressure sensitive adhesive in the region located outside of the reseal margin and the portion of the pressure sensitive adhesive extending over the permanent adhesive in the region located outside of the reseal margin.

* * * * *